United States Patent
Matsumoto et al.

(10) Patent No.: US 8,518,474 B2
(45) Date of Patent: Aug. 27, 2013

(54) METHOD FOR PRODUCING IODINE TYPE POLARIZING FILM

(75) Inventors: Koji Matsumoto, Niihama (JP); Narutoshi Hayashi, Niihama (JP); Nobuyuki Kurata, Habikino (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 1434 days.

(21) Appl. No.: 10/538,079

(22) PCT Filed: Dec. 12, 2002

(86) PCT No.: PCT/JP02/13036
§ 371 (c)(1),
(2), (4) Date: Jun. 9, 2005

(87) PCT Pub. No.: WO2004/053543
PCT Pub. Date: Jun. 24, 2004

(65) Prior Publication Data
US 2006/0045982 A1 Mar. 2, 2006

(51) Int. Cl.
*B05D 5/06* (2006.01)
*C03C 17/00* (2006.01)
*G02B 1/10* (2006.01)
*C08J 7/04* (2006.01)

(52) U.S. Cl.
USPC .................. 427/163.1; 427/495

(58) Field of Classification Search
USPC .................. 427/495, 160–169
See application file for complete search history.

(56) References Cited

U.S. PATENT DOCUMENTS

| | | | | |
|---|---|---|---|---|
| 5,512,178 A * | 4/1996 | Dempo | .................. | 210/638 |
| 5,670,092 A * | 9/1997 | Starzewski | .................. | 252/585 |
| 6,337,369 B1* | 1/2002 | Isozaki | .................. | 525/61 |
| 6,362,244 B1* | 3/2002 | DesMarais et al. | .......... | 521/64 |
| 2002/0001700 A1* | 1/2002 | Sanefuji et al. | .......... | 428/220 |

FOREIGN PATENT DOCUMENTS

| | | |
|---|---|---|
| CN | 1220735 A | 6/1999 |
| EP | 0 297 927 A | 1/1989 |
| EP | 0 926 515 A | 6/1999 |
| EP | 0926515 A1 | 6/1999 |

* cited by examiner

*Primary Examiner* — David Turocy
*Assistant Examiner* — Michael G Miller
(74) *Attorney, Agent, or Firm* — Birch, Stewart, Kolasch & Birch, LLP

(57) ABSTRACT

A method for producing a polarizing film comprising the step of dipping a polyvinyl alcohol film in/on which iodine is adsorbed and oriented in an aqueous solution containing boric acid wherein contact between the aqueous solution and oxygen is suppressed. The produced polarizing film has a high contrast.

9 Claims, 1 Drawing Sheet

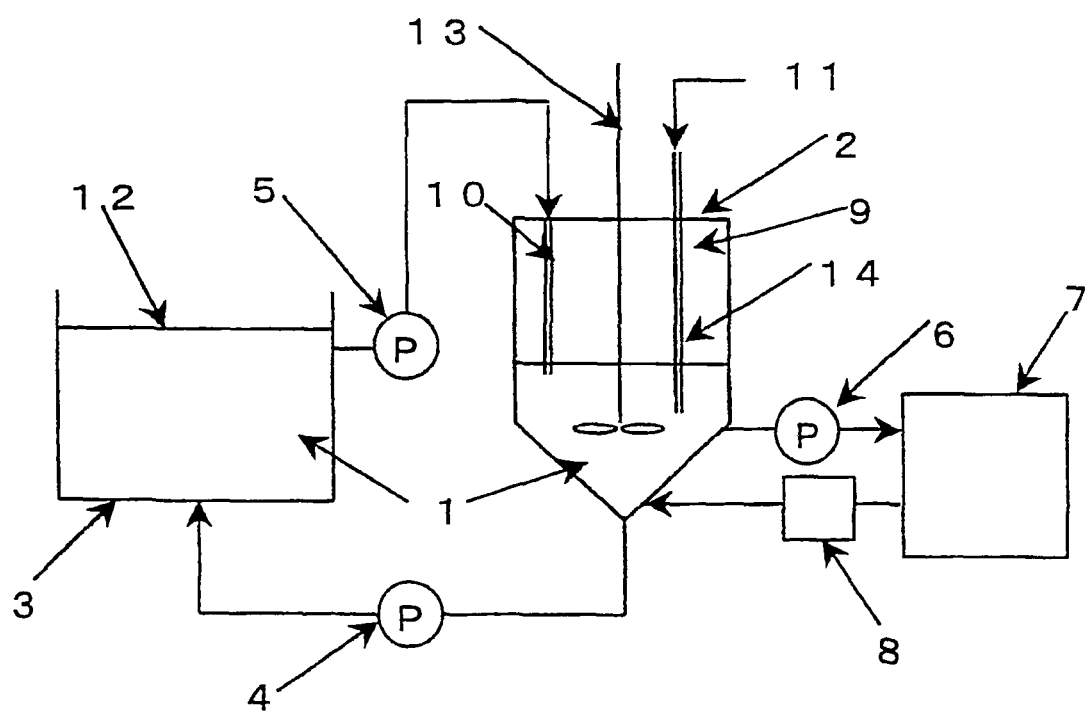

METHOD FOR PRODUCING IODINE TYPE POLARIZING FILM

TECHNICAL FIELD

The present invention relates to a method for producing an iodine type polarizing film which exhibits a high contrast.

BACKGROUND ART

Nowadays, as polarizing films, generally, a polyvinyl alcohol base film (PVA film) in/on which iodine is adsorbed and oriented, a PVA film in/on which a dichroic dye is adsorbed and oriented, and the like are known. Such a polarizing film is usually used in the form of a polarizing plate comprising the polarizing film and a protective film adhered to at least one surface, preferably to both surfaces of the polarizing film.

Among those polarizing films, an iodine type polarizing film is usually produced by dipping a PVA film in/on which iodine is adsorbed and oriented in an aqueous solution containing boric acid and widely used as a part of a liquid crystal display since it has a higher light transmittance and a higher degree of polarization, that is, a better contrast than the dyestuff type polarizing film.

In these years, with the expansion of the application fields of liquid crystal displays and the progress of the peripheral technologies, the requirements for the optical properties and performances of the polarizing plate become higher and higher. That is, in the case of liquid crystal displays which are used outdoors or require low electricity consumption, polarizing films having high transparency and a high degree of polarization, that is, a high contrast are required. However, the currently available iodine type polarizing films do not necessarily satisfy those requirements sufficiently.

DISCLOSURE OF THE INVENTION

As the result of extensive studies to solve those problems of the conventional iodine type polarizing films, it has been found that an iodine type polarizing film having a high contrast can be produced by treating a PVA film in/on which iodine is adsorbed and oriented with an aqueous solution containing boric acid while suppressing contact between the aqueous solution containing boric acid and oxygen.

Accordingly, the present invention provides a method for producing a polarizing film comprising the step of dipping a polyvinyl alcohol film in/on which iodine is adsorbed and oriented in an aqueous solution containing boric acid wherein contact between the aqueous solution and oxygen is suppressed.

BRIEF DESCRIPTION OF DRAWING

FIG. 1 schematically shows an apparatus used for the production of a polarizing film in Example 3.

PREFERRED MODE FOR CARRYING OUT THE INVENTION

The PVA film to be used in the present invention may be obtained by making a film from polyvinyl alcohol or saponified ethylene-vinyl acetate copolymers, which may optionally comprise a small amount of other comonomer. Examples of the other comonomer include unsaturated carboxylic acids (e.g. acrylic acid, methacrylic acid, ethyl acrylate, n-propyl acrylate, methyl methacrylate, etc.), olefins (e.g. ethylene, propylene, 1-butene, 2-methylpropylene, etc.), vinyl ethers (e.g. ethyl vinyl ether, methyl vinyl ether n-propyl vinyl ether, isopropyl vinyl ether, etc.), unsaturated sulfonic acids (e.g. vinylsulfonate, sodium vinylsulfonate, etc.) and the like.

The PVA resins usually have a polymerization degree of about 1,000 to about 10,000, preferably about 1,500 to about 5,000.

The PVA resins usually have a saponification degree of about 85 to 100% by mole, preferably about 98 to 100% by mole.

The PVA films may be produced by any conventional method for producing the films of the PVA resins, and the production methods are not limited.

The thickness of the PVA film is not limited, and may be from about 30 μm to about 150 μm.

The iodine type polarizing film to be used in the present invention may be produced from a PVA film by any conventional method. For example, an unstretched PVA film is uniaxially stretched in an aqueous solution and then dipped in a solution containing iodine and potassium iodide, an unstretched PVA film is dipped in a solution containing iodine and potassium iodide and then uniaxially stretched, an unstretched PVA film is uniaxially stretched in a solution containing iodine and potassium iodide, an unstretched PVA film is stretched at suitable stretch ratios in a plurality of dipping steps, or an unstretched PVA film is uniaxially stretched in a dry state and then dipped in a solution containing iodine and potassium iodide.

The total stretch ratio, that is, a ratio of the length of the finally stretched PVA film to that of the original unstretched PVA film, is usually from 3 to 7 times, preferably from 4 to 6 times.

The PVA film may be stretched in a direction perpendicular to the above uniaxial stretching direction using a suitable apparatus such as an expander roll or a cloth guider in the process for producing the polarizing film.

The composition of the solution containing iodine and potassium iodide is such that a weight ratio of water:iodine:potassium iodide is 100: (0.005-0.5):(0.5-10). Optionally, the solution may contain a third component such as boric acid, zinc iodide, etc. When this solution contains boric acid, it is not regarded as an aqueous solution containing boric acid in which the PVA film in/on that iodine is adsorbed and oriented is dipped according to the present invention.

The temperature of the solution containing iodine and potassium iodide is usually from about 20° C. to about 50° C.

Then, the PVA film in/on which iodine is adsorbed and oriented is treated with the aqueous solution containing boric acid by dipping the PVA film in the aqueous solution.

The composition of the aqueous solution containing boric acid and potassium iodide is such that a weight ratio of water:boric acid:potassiumiodide is usually 100:(2-15):(2-20), preferably 100:(4-12):(5-15), more preferably 100:(5-12):(6-12). Optionally, the aqueous solution may contain zinc chloride, zinc iodide, etc. Furthermore, one or more metal iodide other than potassium iodide, for example, zinc iodide may be used in addition to or in place of potassium iodide.

The temperature of the aqueous solution containing boric acid is usually at least 50° C., preferably from 55° C. to 85° C., more preferably from 60° C. to 80° C.

The treating time of the PVA film with the aqueous solution containing boric acid is not limited, and may be from 60 to 1,200 seconds, preferably from 120 to 600 seconds, more preferably from 150 to 500 seconds.

During the treatment with the aqueous solution containing boric acid, the PVA film in/on which iodine is adsorbed and oriented may optionally be further stretched uniaxially.

The treatment with the aqueous solution containing boric acid may be carried out in plural steps using plural treating baths. In such a case, the conditions in the plural treating steps such as the temperature, the concentration of the solution and/or the stretch ratio may be the same or different.

In the method of the present invention, the contact between the aqueous solution containing boric acid and oxygen is suppressed or blocked.

To suppress or block the contact between the aqueous solution containing boric acid and oxygen, for example, an oxygen concentration in an atmosphere which is in contact with the aqueous solution containing boric acid may be 5% by volume or less. For example, the atmosphere which is in contact with the aqueous solution containing boric acid is filled with an inactive gas such as nitrogen or inert gas (e.g. helium, argon, etc.). Among them, nitrogen is preferably used from the viewpoint of costs.

A method for suppressing or blocking the contact between the aqueous solution containing boric acid and oxygen is not limited. Practically, a method for replacing a gas, usually an air, which is in contact with the aqueous solution containing boric acid, with an inactive gas is preferable. For example, following methods may be used:

1) a hood is provided over the liquid surface of the aqueous solution containing boric acid in a treating bath and an inactive gas is supplied in the hood;
2) a hood is provided over the liquid surface of the aqueous solution containing boric acid in a treating bath and an inactive gas is bubbled directly in the aqueous solution containing boric acid.

However, the present invention is not limited to these methods.

When it is difficult to provide a hood over the liquid surface of the aqueous solution containing boric acid in a treating bath, the following method may be employed:

3) the aqueous solution containing boric acid in a treating bath is circulated between the treating bath and a spare tank while bubbling an inactive gas in the spare tank.

In this method, to prevent the dissolution of oxygen in the air into the aqueous solution containing boric acid in the treating bath, it is preferably to maintain the liquid surface of the aqueous solution containing boric acid at a constant level by providing a water gauge in the treating bath and controlling an amount of the aqueous solution to be circulated between the treating bath and the spare tank while controlling the level of the liquid surface with PC. In addition, it is preferable to provide a discharge orifice or a supply orifice to the treating bath or the spare tank so that the air is dissolved in an amount of as small as possible into the aqueous solution containing boric acid. More preferably, a plurality of the discharge orifices and/or the supply orifices are provided.

Instead of the bubbling of the inactive gas in the spare tank, the space in the spare tank is filled with an inactive gas and then the aqueous solution containing boric acid from the treating bath may be allowed to freely fall from the top of the spare tank onto the liquid surface of the aqueous solution containing boric acid in the spare tank. The aqueous solution containing boric acid is sufficiently in contact with the inactive gas while it freely falls and/or when it collides with the surface of the aqueous solution containing boric acid in the spare tank.

It is possible to confirm whether the contact between the aqueous solution containing boric acid and oxygen is sufficiently suppressed or blocked by measuring an oxygen concentration in an atmosphere which is in contact with the aqueous solution containing boric acid. The oxygen concentration is preferably 0% based on the volume of the atmosphere gas where the total of partial pressures of all the gasses is equal to atmospheric pressure. Practically, the oxygen concentration is 5% or less, preferably 3% or less.

In the present invention, it is most preferable that the contact between the aqueous solution containing boric acid and oxygen is suppressed or blocked in any part of an apparatus used to carry out the method of the present invention. If it is difficult to suppress or block such contact in all the parts of the apparatus, the effect of the present invention may be attained to some extent by supplying a means for suppressing the contact between the aqueous solution containing boric acid and oxygen only to a part where the oxygen is easily dissolved in the aqueous solution containing boric acid, for example, a part where the liquid surface waves more largely than other parts.

The PVA film in/on which iodine is adsorbed and oriented is preferably treated with the aqueous solution containing boric acid while treating the aqueous solution with activated carbon continuously or intermittently. To carry out the dipping treatment while treating the aqueous solution with activated carbon, for example, a part of the aqueous solution containing boric acid is drained from the treating bath using a pump, etc., filtrated through an activated carbon filter and then returned to the treating bath. The polarizing film having a high contract can be constantly produced when the treatment with activate carbon is combined.

When the treatment of the PVA film with the aqueous solution containing boric acid is carried out in a plurality of treating baths, preferably, the contact between the aqueous solution and oxygen is suppressed and/or the aqueous solution is treated with activated carbon in each treating bath and/or in each spare tank.

The stretched PVA film which has been treated with the aqueous solution containing boric acid may be post-treated by conventional methods such as washing with water, drying, etc. to obtain the polarizing film.

Then, a protective film is laminated on at least one surface of the polarizing film obtained by the above steps to provide the polarizing plate. Examples of the protective film include films of cellulose acetates (e.g. triacetylcellulose, diacetylcellulose, etc.), polycycloolefin films (e.g. polynorbornene films, etc.), acrylic resin films, polyester resin films, polyolefin resin films, polycarbonate resin films, polyarylate resin films, polyether sulfone resin films, and the like.

The protective film may have a function as a retardation film, a function as a reflective polarizing film (e.g. DBEF available from 3M Company), etc. Such a protective film may be adhered to one or both of the surfaces of the polarizing film According to the present invention, the iodine type polarizing film having a higher contrast than the conventional iodine type one can be easily produced. Furthermore, the method of the present invention can be easily carried out continuously and can stably produce the polarizing films with good productivity.

EXAMPLES

The present invention will be illustrated by the following examples, which do not limit the scope of the invention in any way.

The polarizing films obtained in the Examples were evaluated by the following method:

A transmittance through a pair of polarizing films each carrying protective films adhered to the both surfaces, which are superposed on one another so that the absorbing axes are aligned in the same direction, is referred to as a parallel position transmittance Tp, while a transmittance through a pair of the polarizing films, which are superposed on one another so that the absorbing axes are perpendicular each other, is referred to as perpendicular position transmittance Tc.

Here, a transmittance T was calculated from spectral transmittances τ(λ) measured at every 10 nm in the range between 400 nm and 700 nm according to the following equation (1)

$$T = \frac{\int_{400}^{700} P(\lambda) y(\lambda) \tau(\lambda) d\lambda}{\int_{400}^{700} P(\lambda) y(\lambda) d\lambda} \quad (1)$$

wherein P(λ) is a spectral distribution of a standard light (C light source) and y(λ) is a two-degree visual filed isochromatic function.

The spectral transmittances τ(λ) were measured with a spectrophotometer (UV-2200 manufactured by Shimadzu Corporation).

From the parallel transmittance Tp and the perpendicular transmittance Tc obtained, a contract Cr was calculated according to the following equation (2):

$$Cr = Tp/Tc$$

Example 1

A PVA film having an average polymerization degree of 2,400, a saponification degree of 99.9% by mole or more and a thickness of 75 μm was uniaxially stretched in a dry state at a stretch ratio of 5 to obtain a stretched PVA film. Then, a continuous web of the stretched PVA film, which was maintained in the stretched state, was successively dipped in pure water at 60° C. for 60 seconds, in an aqueous solution having a weight ratio of iodine:potassium iodide:water of 0.05:5:100 at 28° C. for 60 seconds and then in an aqueous solution having a weight ratio of potassium iodide:boric acid:water of 6:7.5:100 at 73° C. for 300 seconds, washed with pure water at 15° C. for 10 seconds, and dried at 50° C. for about 4 minutes to obtain an iodine type polarizing film.

In this Example, nitrogen gas was bubbled in the aqueous solution containing boric acid at a rate of 1.8 parts by volume (at 25° C. under atmospheric pressure) per hour through a tube inserted in the solution, thereby the oxygen concentration in the gas in contact with the aqueous solution was maintained at 3% by volume or less from the preparation of the solution to the end of the dipping treatment.

The continuous web of the iodine type polarizing film was supplied to the following step without cutting:

A PVA base adhesive was applied to the both surfaces of the polarizing film, and then protective films of triacetylcellulose each having a thickness of 80 μm, the surfaces of which were saponified ("FUJITACK UV80" available from Fuji Photo Film Co., Ltd.), were adhered to the respective surfaces of the polarizing film, followed by drying at 50° C. for 5 minutes to obtain a polarizing plate, which had a contrast of 2,000.

Example 2

In this Example, the apparatus shown in FIG. 1 was used to produce a polarizing film.

The aqueous solution containing boric acid and potassium iodide (1) (weight ratio of potassium iodide:boric acid:water=6:7.5:100) (11 parts by volume in total) was supplied from the tank (2) (having a volume of 12 parts by volume) to the treating bath (3) with the pump (4), while the aqueous solution (1) was returned from the treating bath (3) to the tank (2) with the pump (5), so that the volume of the aqueous solution (1) in the treating bath (3) was constantly maintained at 5 parts by volume. The temperature of the aqueous solution (1) in the treating bath (3) was constantly maintained (at 73° C.±0.5° C.) by heating the aqueous solution (1) in the tank (2) with a heater (not shown) and the supplying the heated solution to the treating bath (3).

During the treatment of the PVA film in the treating bath (3), a predetermined amount of the aqueous solution (1) was drained from the tank (2) with the pump (6) and filtrated through the activated carbon filter (7) and the polypropylene filter (8). Thereafter, the filtrated aqueous solution was recycled to the tank (2).

In the tank (2), the nitrogen gas (11) was bubbled through the nitrogen-supply pipe (14), the lower end of which was submerged under the surface of the aqueous solution (1), so that the oxygen concentration in the space (9) above the aqueous solution (1) was maintained at 2%±1% by volume.

The aqueous solution (1), which was recycled from the treating bath (3), was returned to the tank (2) through the pipe (10), the lower end of which was submerged under the surface of the aqueous solution (1) in the tank (3). In addition, the aqueous solution (1) in the tank (2) was continuously agitated with the agitator (13).

The surface (12) of the aqueous solution (1) in the treating bath (3) was allowed to be in contact with an air.

A PVA film having an average polymerization degree of 2,400, a saponification degree of 99.9% by mole or more and a thickness of 75 μm was uniaxially stretched in a dry state at a stretch ratio of 5, and was dipped in pure water at 60° C. for 60 seconds and then in an aqueous solution having a weight ratio of iodine:potassium iodide:water of 0.05:5:100 at 28° C. for 60 seconds while maintaining the stretched state of the film. Thereafter, the film was continuously dipped in the aqueous solution (1) in the treating bath (3) for 300 seconds.

Then, a polarizing plate was produced in the same manner as in Example 1 except that the polarizing film produced in the above steps was used in place of the polarizing film produced in Example 1.

The polarizing plate had a contrast of 2,000.

Example 3

A polarizing plate was produced in the same manner as in Example 2 except that the aqueous solutions which had been recycled for 10 hours was used.

During the treatment of 10 hours, the concentrations of the components in the aqueous solution containing iodine and potassium iodide. (weight ratio of iodine:potassium iodide:water=0.05:5:100) and also in the aqueous solution containing boric acid and potassium iodide (weight ratio of potassium iodide:boric acid:water=6:7.5:100) were monitored every 30 minutes and water, potassium iodide, iodine and boric acid were supplemented in amounts corresponding to reduced amounts so that the original weight ratios were maintained. During the treatment of the PVA film in the aqueous solution containing boric acid, the nitrogen gas was bubbled in the solution in the same manner as in Example 1 to maintain the oxygen concentration in the gas in contact with the aqueous at 3% by volume or less.

The polarizing plate had a contrast of 2,000.

Comparative Example 1

A polarizing plate was produced in the same manner as in Example 1 except that, in the dipping treatment, no nitrogen gas was bubbled in the aqueous solution containing boric acid, and thus the concentration of oxygen in the atmosphere above the aqueous solution was about 20% by volume. The polarizing plate had a contrast of 700.

The invention claimed is:

1. A method for producing a polarizing film comprising the step of dipping a polyvinyl alcohol film in/on which iodine is adsorbed and oriented in an aqueous solution containing boric acid at a temperature of 55 to 85° C. wherein contact between the aqueous solution and oxygen is suppressed,
wherein a weight ratio of water:boric acid:potassium iodide in said aqueous solution containing boric acid is 100:(2-15):(2-20).

2. The method according to claim 1, wherein the contact between said aqueous solution containing boric acid and oxygen is suppressed by adjusting an oxygen concentration in an atmosphere which is in contact with said aqueous solution to 5% by volume or less.

3. The method according to claim 1 or 2, wherein the contact between said aqueous solution containing boric acid and oxygen is suppressed by using an inactive gas as a gas which is in contact with said aqueous solution.

4. The method according to claim 3, wherein the dipping of said polyvinyl alcohol film in said aqueous solution containing boric acid is carried out while bubbling said inactive gas in said aqueous solution.

5. The method according to claim 3, wherein said inactive gas is nitrogen, helium or argon.

6. The method according to claim 1, wherein said polyvinyl alcohol film is dipped in said aqueous solution containing boric acid while said aqueous solution is treated with activated carbon continuously or intermittently.

7. The method according to claim 1, wherein a temperature of said aqueous solution containing boric acid is from 50 to 85° C., and a dipping time is from 90 to 1,200 seconds.

8. The method according to claim 1, wherein said polyvinyl alcohol film has a polymerization degree of 1,500 to 5,000.

9. The method according to claim 1, wherein said polyvinyl alcohol film in/on which iodine is adsorbed and oriented is a film produced by uniaxially stretching an unstretched polyvinyl alcohol film in water and then dipping it in a solution containing iodine and potassium iodide, a film produced by dipping an unstretched polyvinyl alcohol film in a solution containing iodine and potassium iodide and then uniaxially stretching it, a film produced by uniaxially stretching an unstretched polyvinyl alcohol film in a solution containing iodine and potassium iodide, a film produced by uniaxially stretching an unstretched polyvinyl alcohol film in a plurality of dipping steps, or a film produced by uniaxially stretching an unstretched polyvinyl alcohol film in a dry state and then dipping it in a solution containing iodine and potassium iodide.

* * * * *